United States Patent [19]

Nutting

[11] Patent Number: 4,780,766

[45] Date of Patent: Oct. 25, 1988

[54] STILL VIDEO CAMERA HAVING EFFECTIVE IMAGER SENSITIVITY OPTIMIZED FOR ELECTRONIC PREVIEW

[75] Inventor: Thomas C. Nutting, Fairport, N.Y.

[73] Assignee: Eastman Kodak Company, Rochester, N.Y.

[21] Appl. No.: 56,613

[22] Filed: May 29, 1987

[51] Int. Cl.$^4$ ............................................. H01N 5/26
[52] U.S. Cl. ..................................... 358/228; 358/227
[58] Field of Search ........................ 358/227, 228, 909

[56] References Cited

U.S. PATENT DOCUMENTS

| | | | |
|---|---|---|---|
| 4,268,866 | 5/1981 | Rodgers, III | 358/228 |
| 4,300,167 | 11/1981 | Miller et al. | 358/228 |
| 4,365,272 | 12/1982 | Nagai | 358/228 |
| 4,503,508 | 3/1985 | Brooks et al. | |
| 4,532,553 | 7/1985 | Brill | 358/228 |
| 4,599,657 | 7/1986 | Kinoshita et al. | 358/228 |
| 4,603,354 | 7/1986 | Hashimoto et al. | |
| 4,635,126 | 1/1987 | Kinoshita | |
| 4,638,365 | 1/1987 | Kato | |
| 4,684,995 | 8/1987 | Baumeister | 358/228 |
| 4,689,689 | 8/1987 | Saito et al. | 358/228 |

OTHER PUBLICATIONS

Research Disclosure, Apr. 1983, No. 22822, pp. 157-159.
Research Disclosure, Mar., 1982, No. 21504, pp. 70-71.

Primary Examiner—Russell E. Adams
Attorney, Agent, or Firm—David M. Woods

[57] ABSTRACT

The control computer of a still video camera provides discrete video gain adjustments to the signal processing section during preview operation of an electronic viewfinder. Because exposure time is fixed for preview, and depth of field can be dramatically larger than for still recording, focusing discrepancies can arise between the viewfinder display and the subsequent still recording. This is true especially as light levels are increasing. Discretely varying the video gain has the effect of discretely varying the effective exposure value at the plane of the image sensor. Thus, by lowering video gain during preview for high light levels and concomitantly reducing the exposure value, the viewfinder aperture is driven further open to a value more closely matching the still aperture. As a large aperture means reduced depth of field, focusing errors are reduced.

8 Claims, 2 Drawing Sheets

STILL VIDEO CAMERA HAVING EFFECTIVE IMAGER SENSITIVITY OPTIMIZED FOR ELECTRONIC PREVIEW

BACKGROUND OF THE INVENTION

FIELD OF THE INVENTION

The present invention pertains to the field of video recording and, more particularly, to a still video camera of the type that produces a movie image for an electronic viewfinder in addition to a still image for recording.

BRIEF DESCRIPTION OF THE DRAWINGS

The invention, and the prior art, will be described in relation to the drawings, in which.

DESCRIPTION RELATIVE TO THE PRIOR ART

Figure 1:
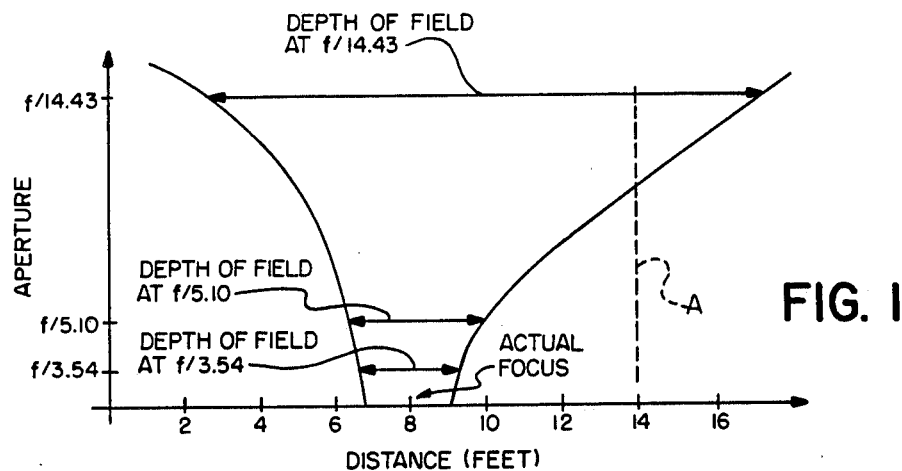
FIG. 1 is a depth-of-field chart helpful in describing the problem of focusing in relation to the prior art.

A still video camera can be usefully combined with an electronic viewfinder for previewing a picture before recording and for reviewing the picture after recording. previewing allows correction of composition problems (e.g., framing) and exposure failure conditions (e.g., strongly backlit scenes) before recording the picture. Reviewing allows the user to verify the recorded image in relation to the intended picture.

Such a camera operates in two modes: a movie mode for producing and displaying a moving video image (in the viewfinder) and a still mode for producing and recording a still image. The movie mode is comparable to the operation of any motion picture video camera. In this mode, an image sensor is continuously irradiated by image light and a video signal is periodically withdrawn from the sensor. Since the periodic exposure time is fixed to accord with the video image rate (e.g., 1/30th second), the amount of light striking the image sensor is controlled by regulating the optical aperture presented to the image light with an adjustable diaphragm.

In the still mode, it is desirable that exposure time and optical aperture are both adjustable in relation to a constant exposure value at the image plane, thus varying, respectively, the length of exposure and the intensity of the light striking the image sensor. For example, in order to obtain a distinct still image of an object in motion, it is necessary to shorten the exposure time so as to prevent image blur. In shortening the exposure time it is necessary to open the aperture so as to maintain the same exposure value. On the other hand, in order to obtain a distinct still image over a broad distance range, it is necessary to close down the aperture so as to extend the depth of field. Then the exposure time would have to be lengthened accordingly to maintain the same exposure value.

The exposure adjustments in the still mode are thus interactive, that is, exposure time adjustments require corresponding aperture adjustments, and vice-versa, in order to maintain a constant exposure value. Keeping the exposure value at the image plane constant, however, places certain constraints on the video processing system. Conventional automatic gain control (AGC) tends to disturb the exposure value, as the signal level will be automatically adjusted to account for changes in the image light . . . with or without adjustments of the aperture or the exposure time. Automatic gain control is nonetheless used in U.S. Pat. No. 4,638,365 to obtain "complementary" control so that the level of the picture signal does not vary when the quantity of image light is outside a range automatically controllable by the diaphragm. This patent recognizes that, in the event of abnormal light conditions requiring manual aperture adjustments, automatic gain control hinders the desired effect and thus should be held to a constant value. It is thus desirable to sometimes isolate exposure adjustments from gain variability, ordinarily by fixing the gain at a constant value. Utilizing an electronic viewfinder in connection with a fixed gain system, however, exposes the user to an inherent problem in relation to depth of field differences between the movie and still modes.

In a manually focused video camera, the electronic viewfinder is used to determine when the image is properly focused. The proper focus, however, is not a discrete distance but a range of distances through which the image is acceptably defined, i.e., a range determined by the depth of field for a particular focal length, optical aperture, and subject distance. An electronic viewfinder repeats images of the scene at the television frame rate, i.e., 1/30 second. This "exposure time" dictates a particular lens aperture for the existing light condition and, therefore, establishes a particular depth of field for each subject distance. When the viewfinder is used with a video still camera, the light condition that dictates a certain aperture . . . and thus a certain depth of field . . . for the electronic viewfinder may require an entirely different aperture for the still exposure (because the exposure time may not be 1/30 second). Thus the depth of field for viewing may be an incorrect indication of the actual picture-taking condition. The "true" depth of field may be considerably less forgiving than that observed in the viewfinder, with the attendant possibility that a properly-focused subject in the viewfinder may be unfocused (that is, outside the range of focus) in the recorded picture.

An example will help to illustrate the problem. The aperture, or f number (f#), is related to scene illumination (B, in footlamberts), exposure time (t, in seconds) and effective imager speed (S, in equivalent ASA), according to the following formula:

$$(f\#^2) = \frac{(B)(t)(S)}{K} \quad (1)$$

K is a constant of proportionality dependent on the camera, the optical system and the characteristics of the imager. By analogy to a photographic system, K is approximately 4 for the system to be described in connection with the invention. (For more information regarding this relationship, refer to T. H. James, editor, *The Theory of the Photographic Process*, 4th ed. New York: MacMillan Publishing Co., Inc., 1977, particularly pp. 529–530). The effective imager speed is a measure of the light sensitivity of the image sensor as calibrated for a nominal exposure. (By this definition, the image sensor of the described system has a sensitivity of ASA =2 100.) For a scene illumination of 250 footlamberts, as previewed through an electronic viewfinder (t=1/30 second) the aperture during movie mode will be driven to a value that provides the correct exposure for this light level. That is, by substitution into the formula (1), f#=14.43 during the movie mode. The depth of field at this aperture is quite extensive, as shown by FIG. 1 for a typical lens of normal focal length. Though the user focuses the optical system for, say, 8 feet, everything between about 2 and 17 feet will be in sharp focus.

If it is now assumed that the lens is still focused at 8 feet but the actual subject is at 14 feet (as shown by a broken line A in FIG. 1), compare what happens when shifting to a still mode given the same scene illumination. If the user (or the exposure program) selects t=1/500 second for the still exposure time, then, by substituting the new exposure time into formula (1), the still aperture is found to be f#=3.54. The still depth of field is dramatically reduced to include only objects from about 7 feet to 9 feet. When the shutter release is pushed, the aperture changes from f/14.43 to f/3.54 and the imager is exposed for 1/500 second. Though the subject (at 14') is in sharp focus as seen through the viewfinder, it is outside the depth of field for the subject in the larger aperture (f/3.54) and the subject in the recorded still picture will be out of focus.

SUMMARY OF THE INVENTION

By analogy to conventional photographic film, fixing the gain of a still video processing system has the effect of fixing the overall sensitivity value, or effective "ASA rating", of the image sensor. In other words, within the confines of a given "ASA rating", the exposure time and the aperture may be interactively varied so as to always arrive at the same, fixed exposure value at the image plane. Unlike a conventional photographic camera loaded with a particular film, however, the effective imager ASA of a still video system can be varied by changing the gain. This, in turn, leads to new exposure values and new sets of interactive exposure times and aperture values.

If the effective imager ASA is reduced in the movie mode, a new exposure value will be established and the aperture will need to open further (with the exposure time constant) to arrive at this new value, thus reducing the depth of field as seen through the viewfinder. Using formula (1) and the same conditions as before, if the effective imager ASA is reduced from 100 to 12.5 for the movie mode, the new aperture is given by f#=5.10. As shown by FIG. 1, this viewing aperture gives the user a truer indication of the depth of field for the still mode picture, which will be taken at F/3.54 and 1/500 second. Since the depth of field differences are mostly troublesome at increasing light levels, the gain can be selectively reduced in the movie mode as such levels increase.

A concomitant advantage of reducing the effective imager ASA in the movie mode for high light levels is that a much greater dynamic range of ambient light can be accommodated by the viewfinder. By rearranging the variables in the formula (1), it can be shown that an optical system providing an aperture range of f/2 to f/16 will accommodate a dynamic range of 4.8 to 307 footlamberts. Scenes of greater illumination tend to "wash out" in white level and the contrast is generally reduced. Dropping the effective imager ASA to 12.5 dramatically increases the upper end of the dynamic range to 2457 footlamberts, thereby greatly extending the light capability of the viewfinder.

A still video camera can generally benefit from the invention during special operating conditions requiring reduced depth of field or increased dynamic range by generating at least one additional imager sensitivity value. Such a value is obtained by fractionally adjusting the nominal gain factor that is applied to the signal processing section in the absence of such requirements. When such a special operating condition is recognized, the fractionally-adjusted gain factor is applied to the signal processing section in lieu of the nominal gain factor and the aforementioned benefits are obtained.

In relation to the preferred embodiment, a still video camera as further defined includes a diaphragm for regulating the optical aperture presented to image light directed toward an image sensor, a signal processing section for processing a signal generated by the sensor according to a predetermined gain function, and an electronic viewfinder for producing a video image from the processed signal. An exposure sensor generates an exposure signal corresponding to the brightness level of light directed toward the image sensor. When previewing an image through the viewfinder, if the exposure signal indicates a certain brightness level, the gain applied to the signal processing section is lowered, thus lowering the effective imager ASA of the camera. To compensate for the lowered ASA rating, the diaphragm is opened to a larger aperture value (smaller f#), thereby decreasing the depth of field of the viewfinder image. The decreased depth of field more closely matches the depth of field in the still recording mode and focusing errors in shifting between the movie (viewfinder) and the still modes are accordingly reduced.

DETAILED DESCRIPTION OF THE PREFERRED EMBODIMENT

Figure 2:
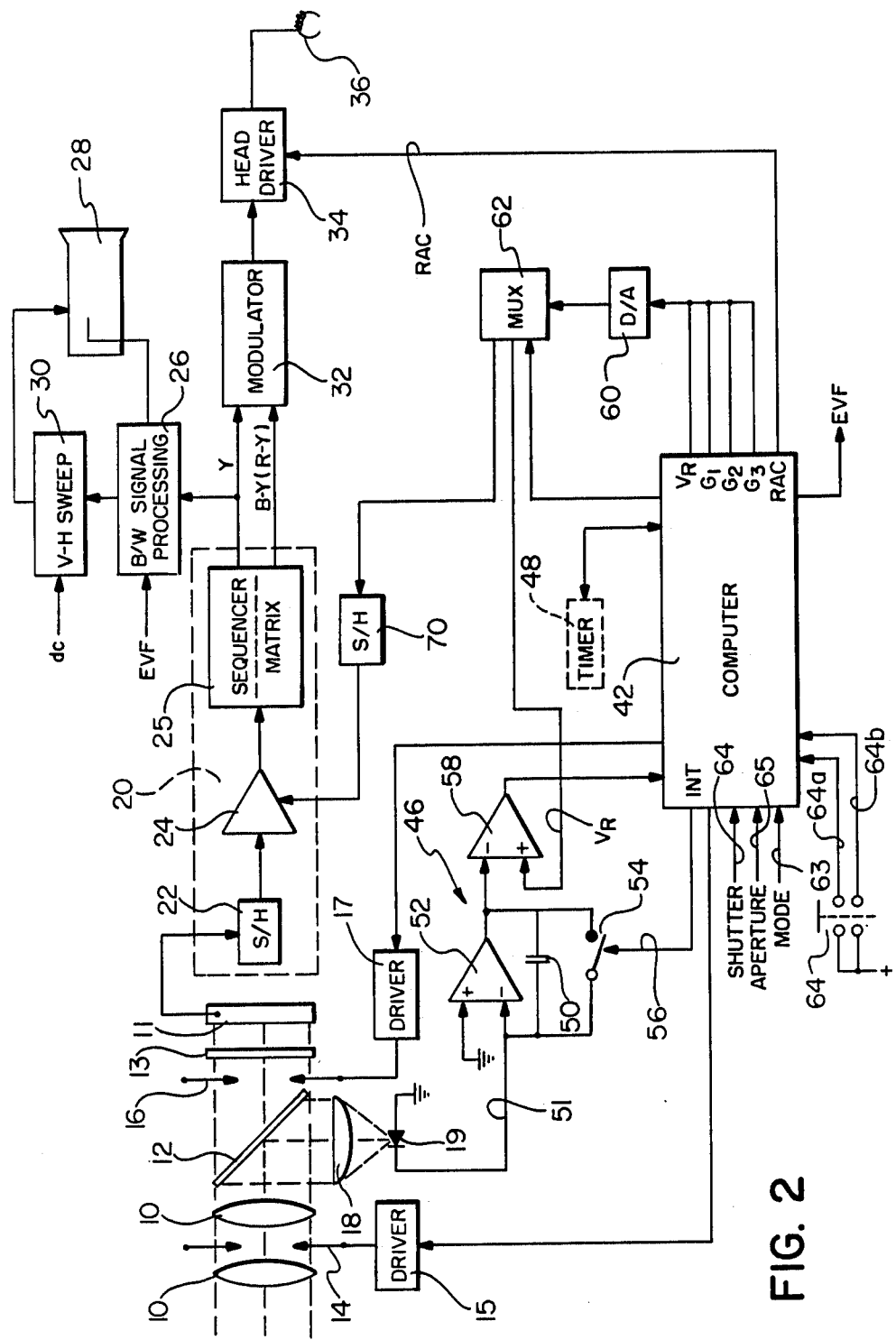
FIG. 2 is a block diagram showing a still video camera that incorporates gain and aperture adjustment in acco ance with the invention.

Referring to FIG. 2, a still video camera is illustrated having an optical section 10 for directing image light from a subject (not shown) to an image sensor 11 through a partially transmissive mirror 12 and a color filter 13. A diaphragm 14 regulates the optical aperture (through which image light passes) by a linkage with a diaphragm driver 15. A shutter 16 regulates the exposure time (of image light upon the image sensor 11) by a linkage with a shutter driver 17. As is well known, exposure is a function of light intensity and time, which are respectively controlled by the diaphragm 14 and the shutter 16. Automatic control of the exposure parameters requires a measurement, which is initiated by diverting a sample of the image light by means of the mirror 12 through a converging lens 18 upon an exposure photodiode 19.

The video signal generated by the image sensor 11 is applied to a signal processing circuit 20, in which the signal from the image sensor 11 is sampled and held by a circuit 22 and applied to a gain-controlled amplifier 24. The output of the amplifier 24 is processed by a circuit 25, which separates and sequences the colors (red, green, and blue), applies white balance correction, and processes the corrected color signals through a matrix. The matrix produces a luminance (Y) signal and a line-sequential stream of color difference signals (R−Y, B−Y). The luminance signal is tapped at this point and directed through a monochrome (B/W) signal processing circuit 26 to a conventional monochrome electronic viewfinder 28. The viewfinder display, which is controlled by conventional vertical and horizontal sweep circuits 30, is activated according to the condition of a control signal EVF. The luminance signal and the color difference signals are input to a modulator 32, which provides a selected preemphasis to the input signals and frequency modulates a suitable set of carriers with the preemphasized signals. When permitted by the condition of a record activate signal RAC, the modulated signal is amplified by a head driver circuit 34 and applied to a recording head 36, which records the modulated signal on a suitable medium (not shown), such as a magnetic disk.

The collection and processing of exposure information is under the control of a computer 42. The grounded exposure photodiode 19 provides a circuit path for the flow of photocurrent to a measuring circuit 46. The circuit 46, which employs an integration cycle in its measuring process, cooperates with a counting procedure (exemplified by a timer 48) in the computer 42 to arrive at a brightness value of the image light. The measuring circuit 46 includes an integrator composed of a capacitor 50 connected between the inverting input and the output of an operational amplifier 52. The output of the amplifier 52 is an integral over time of the photocurrent produced by the photodiode 19 and applied on a line 51 to the inverting input of the amplifier 52. A reset switch 54 is connected across the capacitor 50 for resetting the circuit 46 according to the condition of a signal INT on a line 56 from the computer 42.

The output voltage of the amplifier 52 and a reference voltage $V_R$ are provided to a comparator 58. The value $V_R$ is output as a digital number from the computer 42 and converted into an analog voltage by a digital-to-analog (D/A) converter 60. The analog voltage $V_R$ is switched through a multiplexer 62 (controlled by the computer 42) to the comparator 58 when a voltage comparison is required. The output voltage of the amplifier 52 increases until it equals the reference voltage $V_R$. When equality occurs, the output of the comparator 58, which is connected to the computer 42, changes state, thereby indicating the end of an integration cycle. The timer 48 is zeroed at the beginning of an integration cycle and stopped when the comparator 58 changes state. The value in the counter 48 at that moment therefore represents the integration time, which corresponds to the brightness of the light received by the photodiode 19. The type of measuring circuit employed is further described in connection with exposure control systems in U.S. Pat. No. 4,503,508 and Research Disclosure items 21504 (March, 1982; pp. 70–71) and 22822 (April, 1983; pp. 157–159).

The exposure counter value, that is, the value in the counter 48 representative of the brightness of the image light, is conventionally processed in order to obtain aperture and/or exposure time values for operation of the diaphragm 14 and the shutter 16. (The particular exposure algorithm employed for this calculation is not important for practice of this invention.) Depending on the still exposure mode provided to the computer 42 on a line 63 (e.g., aperture preferred or shutter preferred), either a shutter or an aperture value is specified on respective input line 64 or 65 and incorporated into the algorithm to calculate the unspecified value. If the selected mode is a fully automatic mode, both shutter and aperture values are generated according to the particular exposure algorithm employed. If the still mode is manual, and both values are specified, there is no requirement for automatic still exposure control. In each case, however, the operation of the electronic viewfinder 28 requires automatic exposure control.

Previewing through the viewfinder 28 is initiated by partially depressing a two-position shutter switch 64 to its first position, which activates a line 64a connected to the computer 42. This signal triggers the computer 42 to provide the signal EVF to the B/W signal processing circuit 26, which activates the viewfinder display. Once the desired picture is framed in the viewfinder display, recording is initiated by further depressing the shutter switch 64 and activating a line 64b, which is also connected to the computer 42. The signal EVF is discontinued and the record activate signal RAC is then generated, which powers the head driver 34 and permits a still recording by the head 36 on the media (not shown). The provision of the signal EVF and the ensuing preview activity coincides with the movie mode while the generation of the record activate signal RAC is during the still mode.

Figure 3:
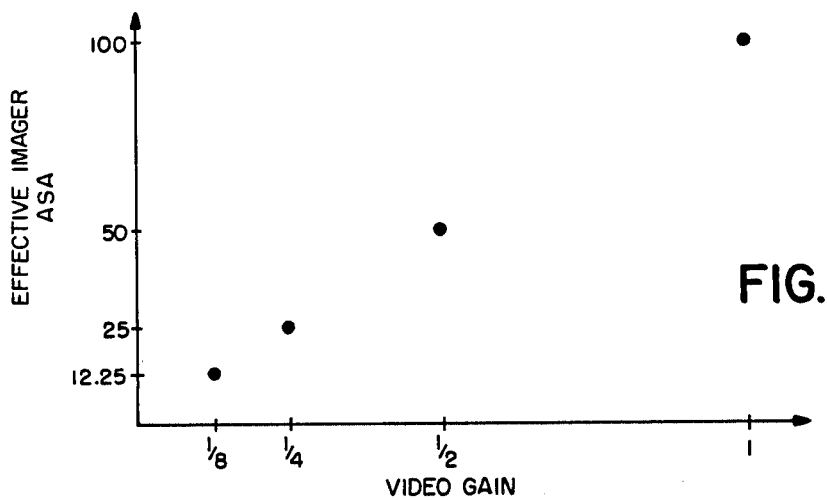
FIG. 3 is a curve of effective imager ASA vs. gain.

To change the effective imager ASA according to the invention, the gain of the gain-controlled amplifier 24 is set at discrete Levels during the movie mode for the different desired values of effective ASA. Assuming a gain=1 is the nominal operating gain of the image sensor (ASA 100) in the still and movie modes, FIG. 3 shows the linear relationship between gain reductions (as fractions of the nominal gain) and the effective imager ASA thereby obtained. With each effective ASA, a new exposure value is obtained for the system, that is, a new combination of exposure times and apertures are needed to provide the same acceptable rendition of the image as before. For example, if a nominal gain=1 (producing an effective ASA=100) generates an acceptable recording at an aperture of f/11 for an exposure time of 1/30 second, then reducing the gain by ½ (producing an effective ASA=50) will produce the same acceptable recording at an aperture of f/8 for an exposure time of 1/30 second. Likewise, reducing the gain again by ½ (gain =¼ of nominal, ASA=25) produces an aperture of f/5.6 for the same exposure time, and again by ½ (gain =⅛ of nominal, ASA=12.5) produces an aperture of f/4 for the same exposure time. The increase in aperture produces a corresponding decrease in depth of field so that the view through the viewfinder 28 gives a progressively truer indication of the actual still depth of field. In addition, bright parts of the image are more accurately reproduced since lowering the gain also increases the high end of the dynamic range of the viewfinder.

Figure 4:
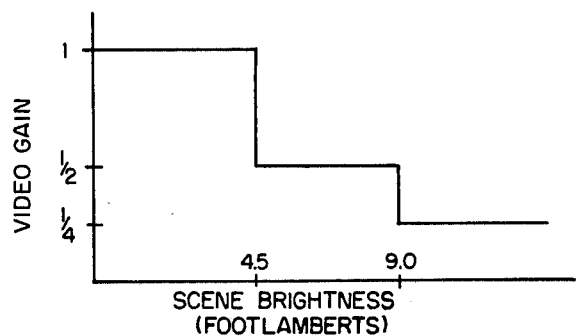
FIG. 4 is a step function showing the brightness levels at which video gain is changed according to the invention.

Referring back to FIG. 2, the computer 42 employs a simple algorithm for determining the light levels at which the gain should be adjusted in the movie mode. In the preferred embodiment, three discrete gain levels are employed: the nominal gain for ASA=100 and two reductions for ASA=50 and 25. The basic aim of the algorithm is is to keep the movie mode aperture as wide open as possible for as wide a range of light conditions as possible. This means that the nominal gain is reduced by half when the light level increases to the point of first requiring a stopped-down aperture for ASA=100, thus further extending the light range for wide open aperture. Then the gain is again reduced by half when the level further increases to the point of requiring a stopped -down movie mode aperture for ASA=50, thus even further extending the wide open aperture range. With even greater brightness levels the aperture will begin to stop down, but at a much higher brightness level than would have been the case for ASA=100. The measuring circuit 46, in conjunction with the timer 48, monitors the image light level during operation of the electronic viewfinder 28 (the movie mode). As shown by FIG. 4, nominal gain is reduced by half when the light level becomes more than 4.5 footlamberts and further by half at more than 9.0 footlamberts. The three discrete video gains are stored by the computer 42 as digital gain numbers $G_1$, $G_2$, and $G_3$. These gain numbers are selectively applied to the D/A converter 60 according to light level and sent by the multiplexer 62 to a sample and hold circuit 70. The gain-controlled amplifier 24 accordingly receives its gain input from the circuit 70.

The preceding gain adjustments occur only during the movie mode, that is, only when the shutter switch 64 is depressed part-way and activates only the line 64a, thereby producing the signal EVF for activation of the viewfinder circuits 26 and 30. As soon as the shutter switch 64 is fully depressed, further activating the line 64b and placing the camera in the still mode, the gain of the amplifier 24 is set to its nominal value (e.g., gain=1) and the still picture is captured by the image sensor 11 according to exposure conditions (exposure time and aperture) suitable for the nominal sensitivity (e.g., ASA 100).

The invention as herein described provides the technical advantage of more closely matching the focus conditions observed through the viewfinder with the focus conditions actually prevailing for the still recording. By looking upon the electronic image sensor 11 as part of a photographic system, and by considering video gain in relation to photographic speed (ASA), a frame work is devised for controlling the effective imager ASA so as to drive the viewing aperture closer to the taking aperture. By holding the video gain at discrete levels, the effective imager ASA can likewise be held at discrete levels. For increasing light levels, the imager ASA is accordingly reduced in the movie mode. Since the exposure time is constant, this drives the aperture further open, thus reducing depth of field in the viewed image and assuring greater accuracy in focusing relative to the recorded still picture. As an additional benefit, lowering video gain increases the dynamic range of the camera, thereby providing a more accurate rendition of highlights and like bright areas of the image in the viewfinder.

The invention has been described in detail with particular reference to a presently preferred embodiment, but it will be understood that variations and modifications can be effected within the spirit and scope of the invention.

What is claimed is:

1. A still video camera having a diagram for regulating the optical aperture presented to image light directed towardd an image sensor, a signal processing section for processing a signal generated by the sensor according to a predetermined gain function, and an electronic viewfinder for producing a video image from said processed signal, said camera comprising:
    exposure sensing means for generating an exposure signal corresponding to the brightness level of light directed toward said image sensor;
    means responsive to said exposure signal corrresponding to an increasing brightness level for lowering the gain applied to the signal processing section; and
    means responsive to the lowered gain for opening the diagram to a larger aperture value thereby decreasing the depth of field of the viewfinder image.

2. A camera as claimed in claim 1 in which said means for lowering the gain lowers the gain according to a discrete step function having two or more discrete levels corresponding to two or more brightness ranges.

3. A camera as claimed in claim 1 in which said means for lowering the gain is operative while the viewfinder is producing a video image.

4. A still video camera having a diaphragm for regulating the optical aperture presented to image light directed toward an image sensor, a signal processing section for processing a signal generated by the sensor according to a predetermined gain function, and an electronic viewfinder for producing a video image from said processed signal, said camera comprising:
    light measuring means for generating a measurement signal corresponding to the brightness level of light directed toward said image sensor;
    means responsive to said measurement signal corresponding to a plurality of increasingly greater brightness levels for generating a corresponding plurality of discrete, decreasing gain factors;
    means for applying said gain factors to the signal processing section during operation of the electronic viewfinder; and
    means responsive to the application of each gain factor to the signal processing section for adjusting the diaphragm to a different aperture value thereby decreasing the image depth of field as seen through the electronic viewfinder for increasing brightness levels.

5. A camera as claimed in claim 4 in which each discrete gain value corresponds to an imager sensitivity value and each corresponding adjustment of said diaphragm provides an aperture value for producing an equivalent exposure for a common exposure time.

6. A camera as claimed in claim 4 in which said one or more gain factors comprises a nominal gain factor for a nominal range of brightness levels and one or more further gain factors corresponding to one or more relatively higher brightness ranges.

7. A camra as claimed in claim 6 including a recording section for recording the signal generated by the sensor and further comprising means for intiating a still video recording and means responsive to said initiating means for applying the nominal gain factor to the signal processing section during opertaion of the recording section regardless of brightness level.

8. A still video camera operable in a movie mode for producing a continuous video display on an electronic viewfinder and in a still mode for producing a still video recording, said camera comprising:
    an image sensor responsive to incident image light for generating a video signal;
    aperture controlling means for regulating the intensity of the light incident upon said image sensor;
    light metering means for producing a measurement signal corresponding to the regulated light intensity;
    driver means responsive to the measurement signal for actuating said aperture controlling means to produce a common image exposure level for the movie ir still modes;
    a gain-controlled amplifier for processing the video signal from said image sensor;
    means operative during the movie mode and responsive to said measurement signal exceeding a predetermined light level for lowering the gain applied to said gain-controlled amplifier; and
    means responsive to said condition of lowered gain during the movie mode for adjusting said driver means to permit a greater intensity of light incident upon said image sensor.

* * * * *

UNITED STATES PATENT OFFICE
CERTIFICATE OF CORRECTION

PATENT NO. : 4,780,766
DATED : October 25, 1988
INVENTOR(S) : Thomas C. Nutting

It is certified that error appears in the above-identified patent and that said Letters Patent are hereby corrected as shown below:

Column 7, line 50, the word "diagram" should read --diaphragm--.

Column 7, line 60, the word "corre-" should read --corre---.

Column 7, line 65, the word "diagram" should read --diaphragm--.

Column 8, line 37, the word "camra" should read --camera--.

Column 8, line 39, the word "intiating" should read --initiating--

Column 8, line 42, the word "opertaion" should read --operation--.

Column 8, line 57, the word "ir" should read --or--.

Signed and Sealed this

Seventh Day of March, 1989

Attest:

DONALD J. QUIGG

*Attesting Officer*    *Commissioner of Patents and Trademarks*